W. S. NICHOLS.
DRAFT EQUALIZER.
APPLICATION FILED NOV. 25, 1911.
1,038,632.
Patented Sept. 17, 1912.
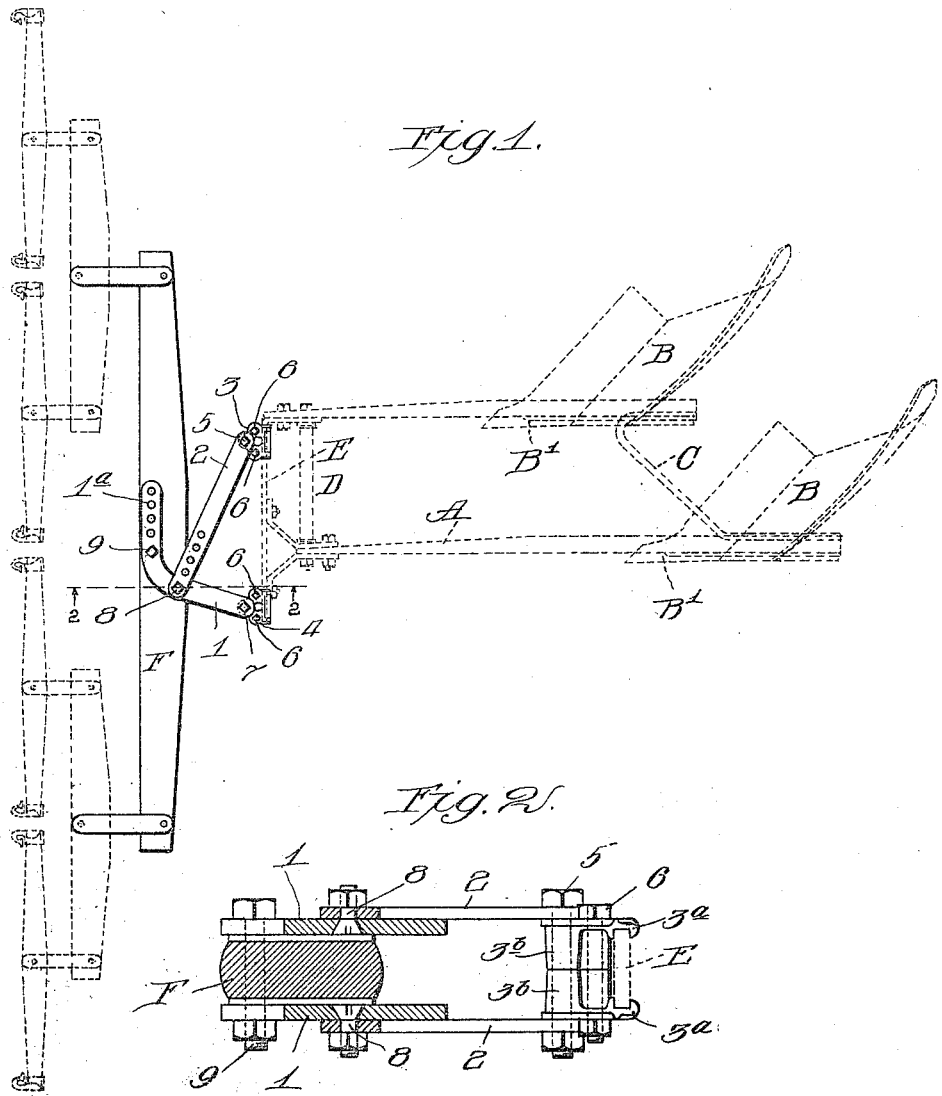

UNITED STATES PATENT OFFICE.

WINFIELD SCOTT NICHOLS, OF PLANO, ILLINOIS, ASSIGNOR TO INDEPENDENT HARVESTER COMPANY, OF PLANO, ILLINOIS, A CORPORATION OF MAINE.

DRAFT-EQUALIZER.

1,038,632.  Specification of Letters Patent.  Patented Sept. 17, 1912.

Application filed November 25, 1911.  Serial No. 662,267.

*To all whom it may concern:*

Be it known that I, WINFIELD SCOTT NICHOLS, a citizen of the United States, residing at Plano, in the county of Kendall and State of Illinois, have invented new and useful Improvements in Draft-Equalizers, of which the following is a specification, reference being had to the accompanying drawings, forming a part thereof.

The purpose of this invention is to provide means attachable to a gang plow, and adapted to so transmit the draft effort as to properly balance the side lateral thrust of the ground upon the plows. It consists of the features and elements described and shown in the drawings as indicated in the claims.

In the drawings:—Figure 1 is a plan view of a device embodying this invention including the dotted outlines of a gang plow to which it is attached and the draft rigging for a four-horse team. Fig. 2 is a detail section taken as indicated at line 2—2 on Fig. 1.

The draft equalizer which is the subject of this invention is shown in plan in Fig. 1, attached to the frame of a gang plow which is indicated in dotted lines only, and consists of longitudinally extending members, A, each carrying a plowshare, B, and connected by transverse members, C, D and E. The draft equalizer consists of a pair of bent bars, 1, 1, and a pair of straight link bars, 2, 2, connected together and to the member, E, of the plow frame. The latter being of flat bar stock set on edge serves as a convenient slide upon which may be clamped the brackets, 3 and 4, whose detail construction is best shown in Fig. 2. The bracket, 3, is provided with a pivot bolt, 5, by which the ends of the links, 2, 2, are connected to the bracket, while clamping bolts, 6, serve to secure it at any desired position in the length of the member E. The bracket, 4, is similarly clamped, and is provided with a pivot bolt, 7, by which the bent bars, 1, 1, are connected to the plow frame. The ends of the links, 2, 2, thus left free, are attached to the bent bars, 1, 1, by short bolts, 8, 8, which do not pass through the evener bar, F, which is carried between the members, 1, 1, upon a pivot bolt, 9. The free ends of the members, 1, 1, being provided with a series of auxiliary bolt holes, 1ª, allow for lateral adjustment of the pivot point of the evener, F, for correctly accommodating the draft to the load of the plow, such lateral adjustment being necessary in view of the lateral thrust arising from the reaction of the earth upon the inclined blades, B, B, which lateral thrust is not entirely overcome by the usual land sides, B¹, B¹, applied to each of the plowshares. The links, 2, 2, are also provided with a series of bolt holes, 2ª, designed to accommodate the bolts, 8, for making the connection between the members, 1 and 2, at different points in the length of the latter. Thus, there are provided three means of lateral adjustment of the pivot bolt, 9, with respect to the plow frame, namely, the slidability of the clamping brackets, 3 and 4, upon the member. E; the adjustability of the bolts, 8, along the members, 2, 2, and the similar adjustability of the bolt, 9, along the members, 1, 1; so that by employing one or more of these expedients, almost any degree of adjustment may be obtained within the desired limits.

I claim:—

1. A draft equalizer comprising, in combination with a frame, a pair of links pivotally connected to the forward end of said frame at points laterally separated, the forward end of one link being pinned to the other link, said other link extending beyond the point of attachment, and having its extending portion provided with a series of apertures, an evener bar provided with a pivot aperture at its mid-point, and a pivot bolt extending through said aperture of the evener bar and through one of the series of apertures of the link for connecting them.

2. A draft equalizer comprising, in combination with a frame, a pair of links pivotally connected to the forward end of the said frame at points laterally separated, the forward end of one link being pinned to the other link, said other link being bent beyond the point of attachment to extend substantially transverse to the direction of travel of the plow, and having its extending portion provided with a series of apertures, an evener bar provided with a pivot aperture at its mid-point, and a pivot bolt adapted to extend through said aperture of the evener bar and through one of the apertures of the link for connecting them.

3. A draft equalizer comprising in combination with a frame, a pair of links pivotally connected to the forward end of said frame at points laterally separated, the forward end of one link being pinned to the other link, said other link extending beyond such point of attachment and having its extending portion provided with a series of apertures, and a pivot bolt adapted to be lodged in any one of said series of apertures for fulcruming an evener bar.

4. A draft equalizer comprising in combination with a frame, a pair of links pivotally connected to the forward end of said frame at points laterally separated, the forward end of one link being pinned to the other link, said other link being bent beyond the point of attachment to extend substantially transverse to the direction of travel of the frame, and having its extending portion provided with a series of apertures, and a pivot bolt adapted to be lodged in any one of said apertures for fulcruming an evener bar.

5. A draft equalizer comprising in combination with a frame member extending transversely of the direction of travel, a pair of pivot brackets mounted on said transverse member and adapted for adjustment therealong independently of each other, a pair of links extending forwardly from said brackets, respectively, means pivotally connecting them thereto, one link being pinned near its forward end to the other link, and a fulcrum pin carried by the other link for securing an evener bar.

In testimony whereof I have hereunto set my hand at Plano Illinois this 21st day of November, 1911.

WINFIELD SCOTT NICHOLS.

Witnesses:
F. H. PHILLIPS,
R. J. PERRY.